United States Patent
Saunders et al.

(10) Patent No.: US 7,111,762 B2
(45) Date of Patent: Sep. 26, 2006

(54) RESERVOIR PRODUCT PUMP

(75) Inventors: Craig M. Saunders, Rocky River, OH (US); Marc L. Vitantonio, South Russell, OH (US); Charles Peter Althoff, Cleveland Heights, OH (US); Jeffery Kalman, Cleveland Heights, OH (US)

(73) Assignee: Nottingham-Spirk Design Associates, Cleveland, OH (US)

( * ) Notice: Subject to any disclaimer, the term of this patent is extended or adjusted under 35 U.S.C. 154(b) by 367 days.

(21) Appl. No.: 10/669,788

(22) Filed: Sep. 24, 2003

(65) Prior Publication Data

US 2004/0118875 A1  Jun. 24, 2004

Related U.S. Application Data

(60) Provisional application No. 60/413,312, filed on Sep. 25, 2002.

(51) Int. Cl.
*G01F 11/06* (2006.01)
(52) U.S. Cl. .................. 222/382; 222/333; 222/383.1; 222/464.1
(58) Field of Classification Search ............. 222/382
See application file for complete search history.

(56) References Cited

U.S. PATENT DOCUMENTS

| 3,173,584 | A |   | 3/1965  | Giavasis |
| 3,289,897 | A |   | 12/1966 | Ginsberg |
| 3,523,629 | A |   | 8/1970  | Chi |
| 3,750,910 | A |   | 8/1973  | Se-kit |
| 3,825,156 | A |   | 7/1974  | Nobou |
| 4,060,182 | A |   | 11/1977 | Kikuchi |
| 4,135,647 | A |   | 1/1979  | Mascia et al. |
| 5,150,841 | A |   | 9/1992  | Silvenis et al. |
| 5,755,361 | A | * | 5/1998  | Restive et al. .............. 222/209 |
| 6,401,752 | B1 |   | 6/2002  | Blackbourn et al. |
| 6,443,334 | B1 | * | 9/2002  | John et al. ................ 222/464.3 |
| 6,470,910 | B1 |   | 10/2002 | Blackbourn et al. |
| 6,554,211 | B1 | * | 4/2003  | Prueter et al. .............. 239/332 |
| 2005/0173462 | A1 | * | 8/2005 | Stumler et al. ............. 222/380 |

* cited by examiner

*Primary Examiner*—J. Casimer Jacyna
(74) *Attorney, Agent, or Firm*—Fay, Sharpe, Fagan, Minnich & McKee, LLP (57) ABSTRACT

An automatic dispenser includes a housing, a reservoir, a pump, an intake tube, and exhaust tube, and a spigot. The reservoir is disposed in the housing. The pump includes a pump chamber and is disposed in the housing. The pump is for drawing liquid from an associated container. The intake tube is in fluid communication with the pump chamber. The intake tube is adapted to be disposed in the associating container. The exhaust tube is in fluid communication with the pump chamber and the reservoir. The spigot is for selectively discharging the liquid from the reservoir. An energy efficient, measured dose appliance is provided.

43 Claims, 9 Drawing Sheets

RESERVOIR PRODUCT PUMP

This application claims priority under 35 U.S.C. §119(e) to U.S. Provisional Patent Application 60/413,312, filed Sep. 25, 2002, which is incorporated by reference.

BACKGROUND OF THE INVENTION

This invention relates to a pumping mechanism that can be mounted to an opening of a bottle. More particularly, the invention relates to a pump that can attach to a liquid laundry detergent bottle; however, the invention is amenable to other applications.

Liquid laundry detergent comes in bottles containing from several tens of ounces to upwards of 200 fluid ounces. These bottles can be bulky, heavy and difficult to handle. To measure the proper amount of detergent needed for one load of laundry, the user must pour from a bottle that can weigh over 12½ pounds into a dose cup that can measure less than one measuring cup. This act of pouring liquid detergent into the dose cup can be difficult for the person doing laundry, especially those who are elderly or have dwindling coordination. Also, an opportunity exists for spilling the liquid detergent when pouring it into the dose cup which can create a mess and waste laundry detergent.

Accordingly, it is desirable to provide a mechanism to aid in measuring the proper amount of laundry detergent that does not require a user to pour the detergent into a cup.

SUMMARY OF THE INVENTION

An automatic dispenser includes a housing, a reservoir, a pump, an intake tube, exhaust tube, and a spigot. The reservoir is disposed in the housing. The pump includes a pump chamber. The pump is for drawing liquid from an associated container. The intake tube is in fluid communication with the pump chamber. The intake tube is adapted to be disposed in the associated container. The exhaust tube is in fluid communication with the pump chamber and the reservoir. The spigot is for selectively discharging the liquid from the reservoir.

An automatic dispenser for dispensing liquid stored in a container includes a housing, a reservoir, a pump, an intake tube and a spigot. The reservoir is disposed in the housing. The pump is in communication with the reservoir. The intake tube is in fluid communication with the reservoir and adapted to be disposed in an associated container. The spigot is in communication with the reservoir for selectively dispensing liquid from the reservoir.

An object of the invention is to provide a mechanism that eliminates the need for a person doing laundry to pour laundry detergent into a dose cup.

Another object of the invention is to provide a mechanism that can lessen the likelihood of spilling laundry detergent.

Another object of the invention is to limit the amount of times a user must handle a bottle of laundry detergent.

Another object of the invention is to limit the amount of energy used to replenish the reservoir after it has been emptied.

Another object of the invention is the provision of a laundry dispenser which is inexpensive to manufacture and easy to use.

BRIEF DESCRIPTION OF THE FIGURES

FIG. 8 is a cross sectional view of the automatic dispenser of FIG. 1 taken along line 8—8 of FIG. 7.

FIG. 13 is a schematic view of the major mechanical components and electrical controls of the automatic dispenser of FIG. 10.

DETAILED DESCRIPTION OF THE PREFERRED EMBODIMENT

It is to be understood that the specific devices and processes illustrated in the attached drawings, and described in the following specification are simply exemplary embodiments of the inventive concepts. Hence, specific examples and characteristics relating to the embodiments disclosed herein are not to be considered as limiting.

Figure 1:
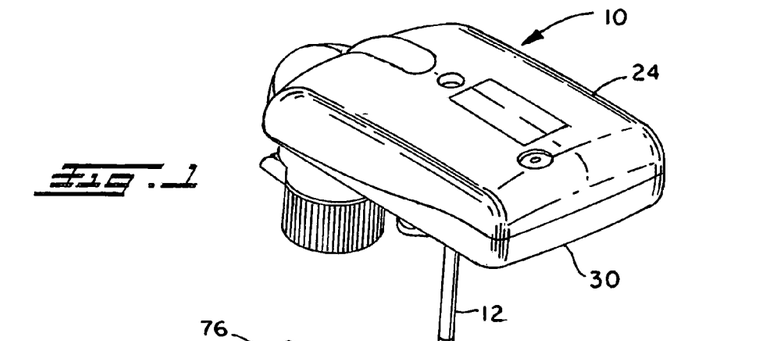
FIG. 1 is a perspective view of an automatic dispenser according to a first embodiment of the present invention.

Referring now to FIG. 1, an automatic dispenser 10 for dispensing liquid from a bottle or container is disclosed. The bottle (not shown) is a conventional retail liquid laundry detergent bottle, however the bottle could be any conventional bottle holding a relatively viscous household liquid. Typically, detergent bottles have top openings surrounded by a threaded neck. Millions of such bottles of detergent are sold each year. The liquid dispensed by the automatic dispenser in the embodiment depicted in the figures is liquid detergent, however the automatic dispenser can dispense any viscous household liquid. Throughout the description, for ease of explanation, the bottle may be referred to as a laundry detergent bottle, however this description should not be found as limiting. Also, the liquid may be referred to as laundry detergent, however this description also should not be deemed as limiting.

Figure 2:
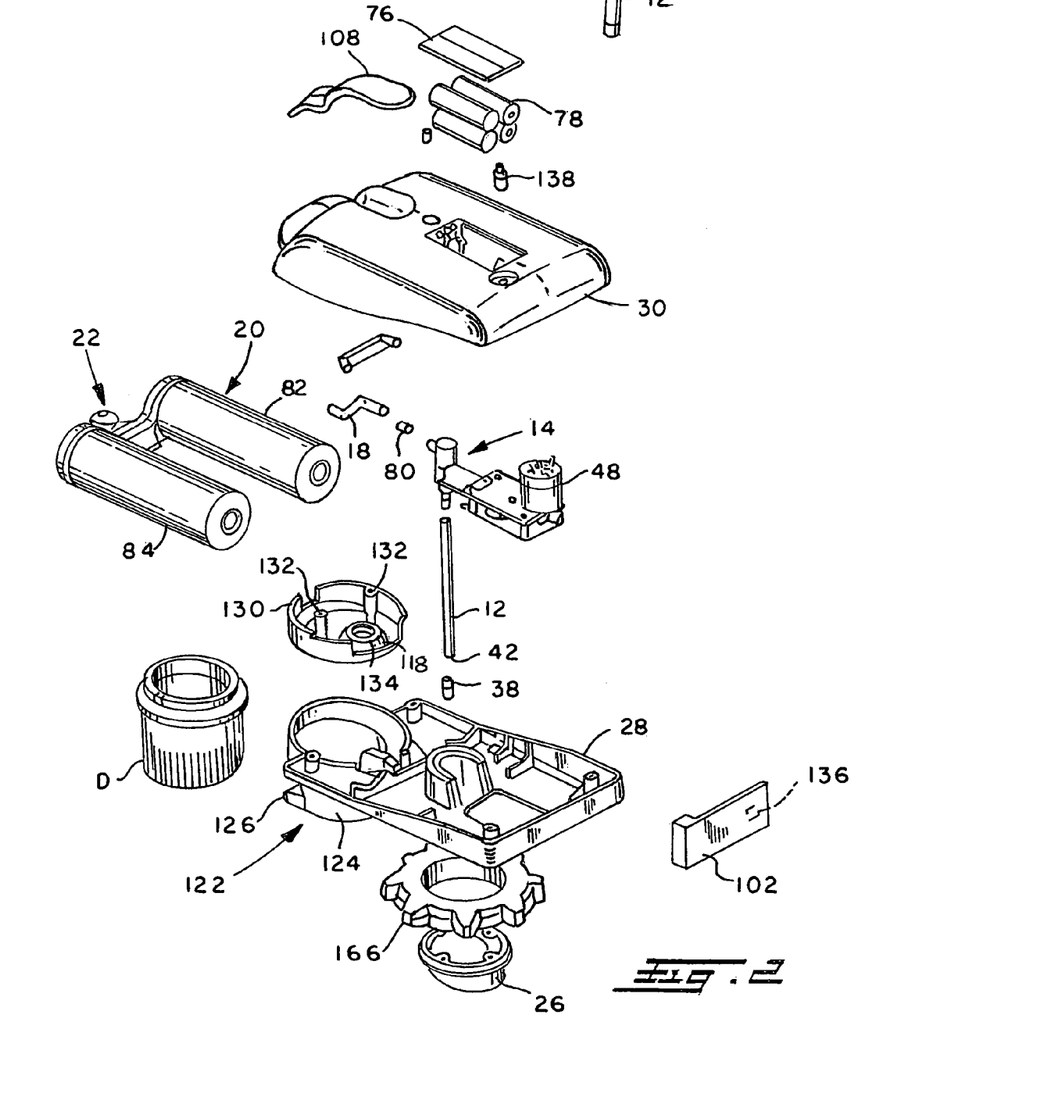
FIG. 2 is an exploded view of the automatic dispenser of FIG. 1.

Referring now to FIG. 2, the automatic dispenser 10 includes an intake tube 12, a pump 14, an exhaust tube 18, a reservoir 20, a spigot 22 and electronic controls. The pump, exhaust tube, reservoir, spigot and electronic controls are enclosed in a housing 24 (FIG. 1), and the housing is mounted on the laundry bottle via a neck 26 which mounts on the threaded neck of the laundry bottle. The housing comprises a lower housing portion 28 and an upper housing portion 30. In use, the dispenser 10 is mounted on a detergent bottle by inserting the intake tube 12 into the bottle and attaching the dispenser neck 26 to the neck of the detergent bottle.

Figure 4:
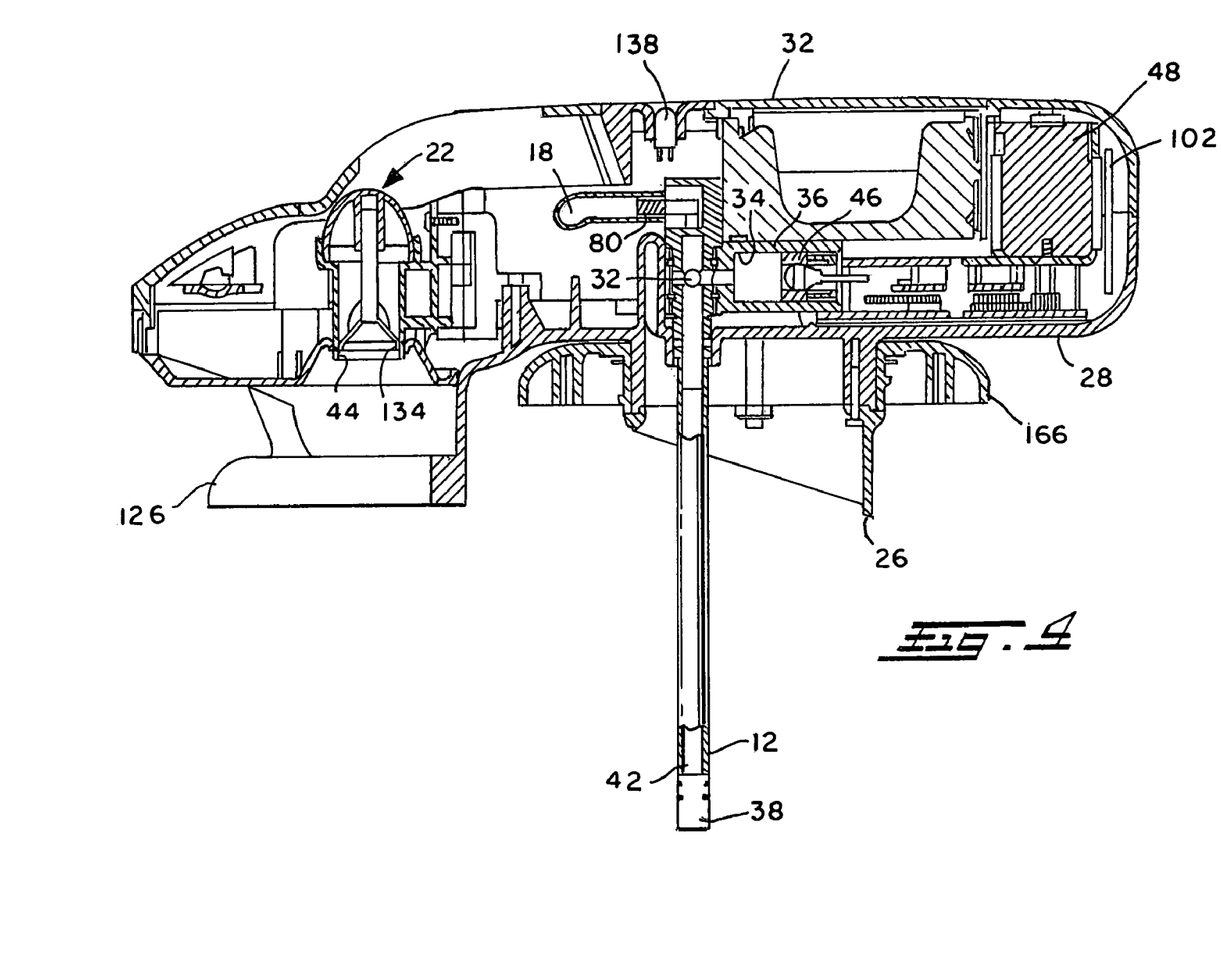
FIG. 4 is a cross-sectional view of the automatic dispenser of FIG. 1 taken along line 4—4 of FIG. 3.

With reference to FIG. 4, the intake tube 12 provides a passageway for the laundry detergent from the bottle to an intake/exhaust chamber 32 of the pump 14. The intake/exhaust chamber 32 communicates with a pump chamber 34 that is defined by a pump cylinder 36. The intake tube 12 depends downwardly from the housing 24 into the bottle (not shown). The intake tube 12 communicates with the intake/exhaust chamber 32 through a check valve 38 allowing fluid to flow into the intake tube only. The intake check valve 38 can be positioned anywhere upstream of the pump chamber 34. A preferred embodiment positions the check valve 38 at an entry opening 42 of the intake tube 12 to enhance pump priming. In the preferred embodiment, the intake tube 12 has a smaller diameter than an outlet 44 defined by the spigot 22. The intake tube 12 is made from a durable material, one example being plastic. The material for the tube should not cause any unwanted reactions with the laundry detergent or any liquid stored in the bottle.

The pump 14 draws the laundry detergent out of the bottle and towards the reservoir 20. A piston 46 reciprocates in the pump cylinder 36. The pump chamber 34 is in fluid communication with both the intake tube 12 and the exhaust tube 18. The volume of the pump chamber 36 is relatively small as compared to the reservoir 20. The piston 46 disposed in the pump chamber 36 is the work member moving the fluid from the intake tube 12 toward the exhaust tube 18 as it reciprocates.

Figures 5, 6:
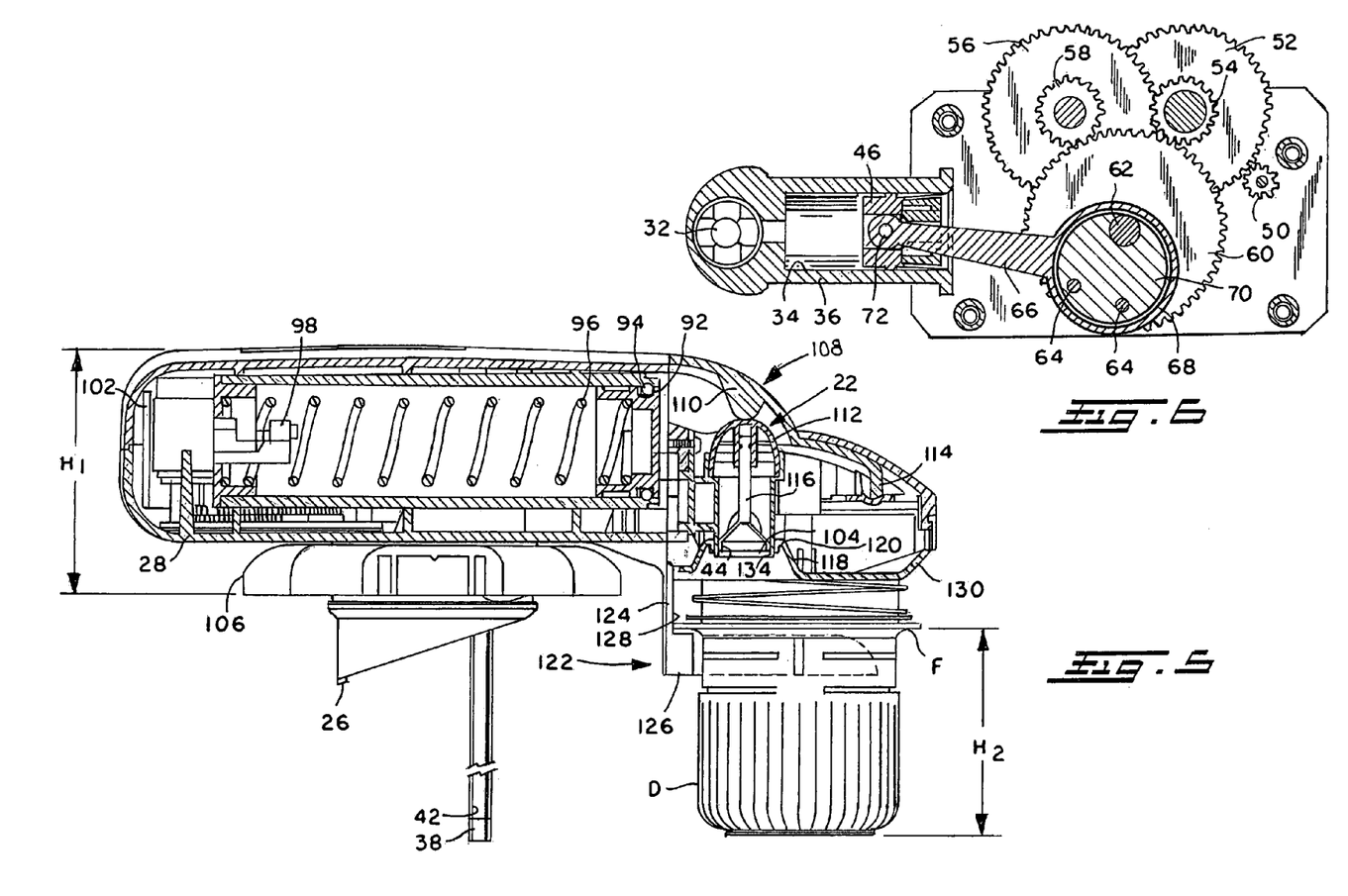
FIG. 5 is a cross-sectional view rotated 180° of the automatic dispenser of FIG. 1 taken along line 5—5 of FIG. 3.
FIG. 6 is a plan view of a transmission that drives a pump of the automatic dispenser of FIG. 1.
Figure 6:
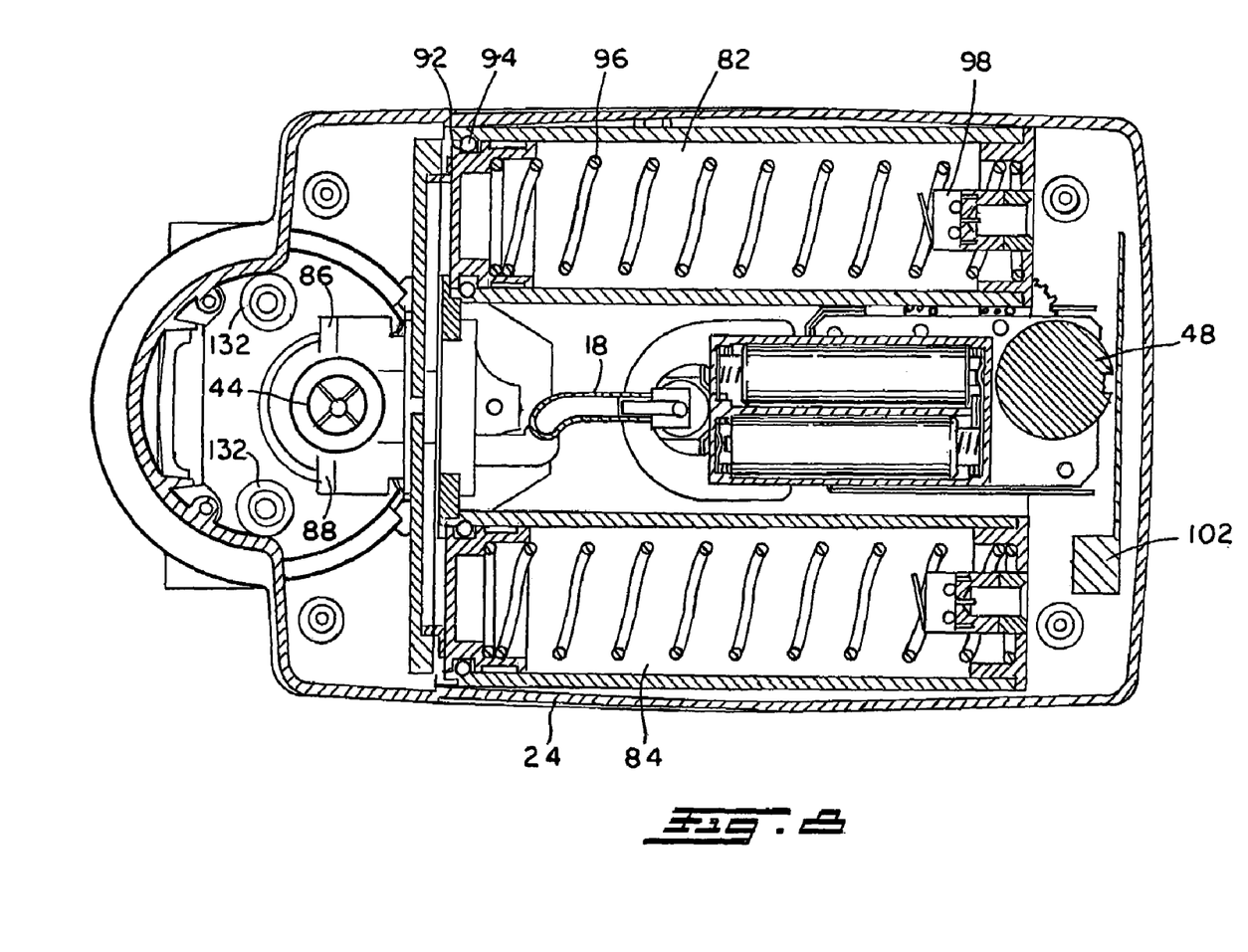
Figure 7:
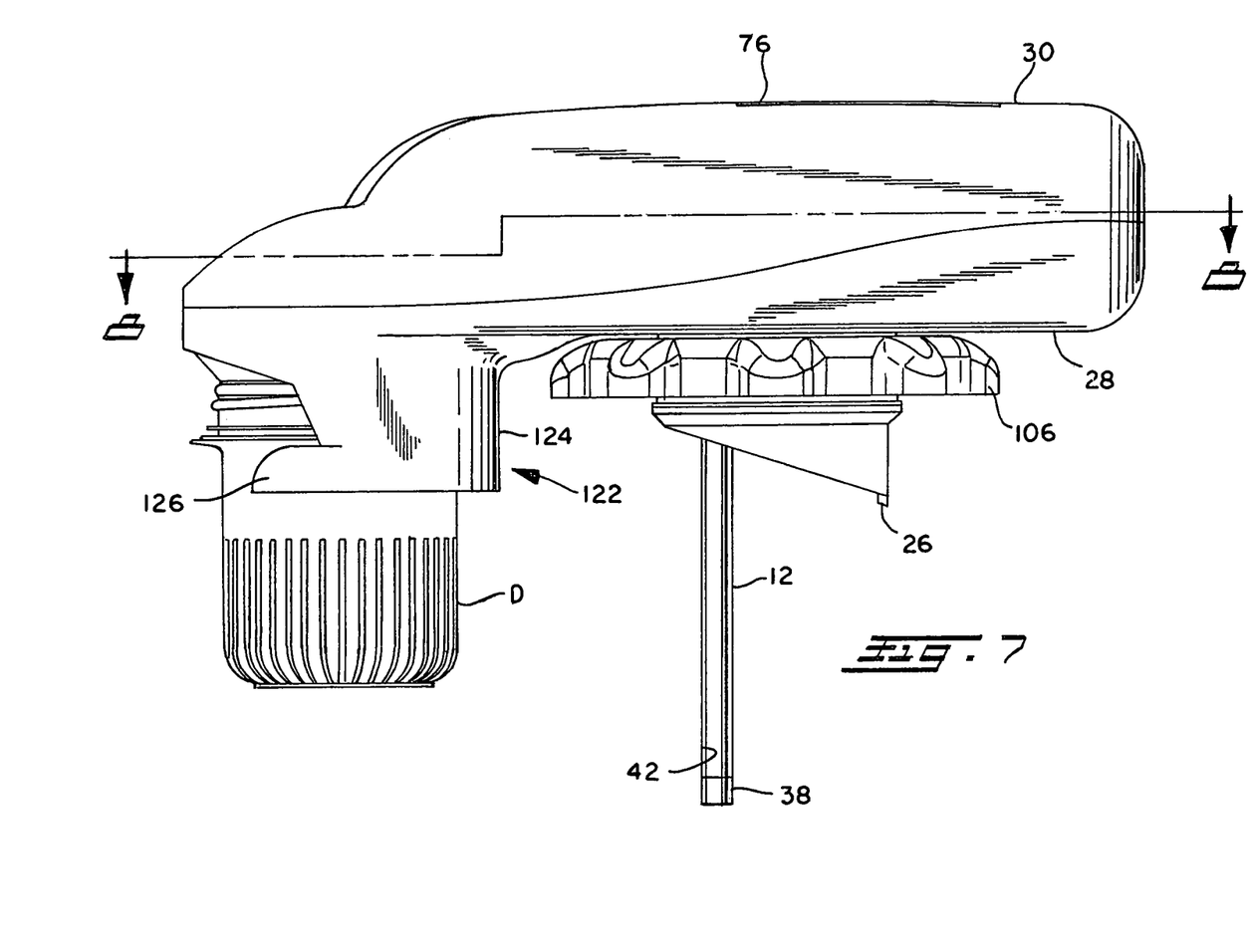
FIG. 7 is a side elevation view of the automatic dispenser of FIG. 1.

A motor 48 drives the piston 46 through a speed-reducing transmission. The size of the motor is relatively small and the motor is energy efficient. Referring to FIG. 6, the motor 48 drives a pinion 50. The pinion 50 drives a first intermediate gear 52. The first intermediate gear 52 drives a first intermediate pinion 54 attached to the first intermediate gear. The first intermediate pinion 54 drives a second intermediate gear 56. The second intermediate gear 56 drives a second intermediate pinion 58 attached to the second intermediate gear. The second intermediate pinion 58 drives a drive gear 60. The drive gear 60 has a large central cylindrical boss 62 concentric with the drive gear and extending laterally from it. The drive gear 60 also has two offset cylindrical bosses 64 extending from the same side of the drive gear 60 as the central boss 62. A piston rod 66 has a large cylindrical bore 68 at is proximal end. The large bore 68 surrounds a cylindrical plate 70 that includes openings that receive the bosses 62 and 64. The distal end of the piston rod 66 pivotally attaches to the piston 46 by means of a piston pin 72. As the drive gear 60 rotates, the bosses 64 rotate about the center of the drive gear moving the plate 70 inside the cylindrical bore 68 of the piston rod 66. The plate 70 rotates within the cylindrical bore 68 moving the piston rod 66 in a reciprocating motion (right to left in the drawing). Accordingly, the rotational movement of the drive gear 60 is translated to axial movement of the piston 46 in the pump cylinder 36. Other conventional mechanisms can be used to translate the rotational movement of the motor to reciprocal movement of the piston.

Referring back to FIG. 2, the motor is powered by a power source 78, which in the preferred embodiment comprises four AA batteries. The power source could also include rechargeable or replaceable batteries, direct AC voltage, or DC voltage delivered through an AC/DC adapter, among other alternatives. The batteries are covered by a removable plate 76 that attaches to the upper housing portion 30.

The motor 48 and pump 14 in the preferred embodiment are configured to be energy efficient. The reservoir 20, which will be described in more detail below, is dimensioned to store one laundry load's worth of liquid detergent. Since a homeowner typically only owns one washing machine, only one laundry load's worth of detergent is needed during a washing cycle, which is about 20 to 30 minutes. Therefore, the reservoir 20 can be refilled slowly, thus more efficiently, while not affecting the timing of washing cycles. The pump 14 and motor 48 are designed for slow, energy efficient replenishment of the reservoir by providing a small pump chamber 34, in comparison to the volume of the reservoir 20. The pump 14 can operate with a pumping rate that allows the reservoir to refill in from several minutes up to about 20–30 minutes, the time of a typical washing cycle. Of course, it is appreciated that the pump 14 and motor 48 can be designed to refill the reservoir 20 more quickly; however, it is likely with such a design that the energy efficiencies of the previously described pump may not be achieved.

Referring back to the path of the laundry detergent from the bottle to the spigot 22, the exhaust tube 18 connects the intake/exhaust chamber 32 (FIG. 4) and the reservoir 20. An exhaust check valve 80 (FIG. 2) is positioned between the intake/exhaust chamber 32 and the exhaust tube 18. The exhaust tube can be made of the same material and be of the same design as the intake tube. The exhaust tube, like the intake tube, has a smaller diameter than the outlet 44.

The reservoir 20, which receives the detergent from the exhaust tube 12, is disposed in the housing and holds one load's worth of laundry detergent, typically 5 to 7 fluid ounces. Alternatively, the reservoir could hold more than one load's worth of detergent or multiple reservoirs can be provided. As seen in FIG. 2, the reservoir 20 comprises a manifold assembly that includes a first chamber 82 and a second chamber 84. In the preferred embodiment, the chambers 82 and 84 are cylindrical. The chambers are positioned horizontally in the housing 24, which reduces the necessary height of the housing. With reference to FIG. 8, the first chamber 82 communicates with the outlet 44, which is defined by the spigot 22, via passageway 86. Likewise, the second chamber 84 communicates with the outlet 44 via passageway 88.

A piston 92 having an O-ring seal 94 at least partially surrounding the piston, a spring 96 and a switch 98 are disposed in the first chamber 82. The same components are also disposed in the second chamber 84; however, for the sake of brevity, and since the components function in the same manner, only the components disposed in the first chamber 82 will be described.

The piston 92 has a cross-sectional shape similar to the cross-sectional shape of the first chamber 82. In a preferred embodiment, the piston and chamber are cylindrical. The seal 94 surrounds the piston 92 so that liquid cannot pass between the periphery of the piston 92 and the wall of the first chamber 82 as the fluid is being pushed out of the chamber and as the chamber is filled. The spring 96 is a helical compression spring; however, other conventional biasing members can be used. The spring 96 extends from the piston 92 to the back wall of the chamber 82. The switch 98 mounts to the same back wall. The switch 98 in this particular embodiment is a micro-switch that communicates via a circuit board 102 with the motor 48.

To fill the reservoir 20, liquid flows from the exhaust tube 18 into the first chamber 82. Fluid pressure pushes the piston 92 towards the switch 98 causing the spring 96 to compress. When the piston 92 contacts the switch 98 and the similar piston in the chamber 84 contacts a similar switch, the switches communicate with the motor 48 to stop pumping because the reservoir is full.

To drain the reservoir, the spigot 22 opens the outlet 44 allowing the spring 96 to exert a force on the piston 92 forcing the liquid out of the outlet. At the same time, the second chamber 84 is also emptied. Since in this embodiment, the reservoir does not drain under gravity flow, the reservoir 20 need not be placed above the spigot 22. Also, no venting of the reservoir 20 is required. Additionally, because of the spring drive, the reservoir 20 drains at a substantially faster rate than it fills.

Even though specific components were described to facilitate draining the reservoir, the reservoir can be drained using other components and in other methods. For example, the reservoir can be a conventional gravity flow reservoir with a relatively large outlet. In another alternative embodiment, the reservoir can include a mechanically loaded piston, similar to the one described above; however, the piston can be loaded with other mechanical energy storage systems such as compressed air, raising a weight or bending an elastic beam, to mention just a few. Also, the liquid can accumulate in a sealed reservoir, which will result in air compression which will result in forced flow through the outlet.

Referring to FIG. 5, the detergent is dispensed through the outlet 44 of spigot 22 which can selectively communicate with the reservoir 20. The size of the outlet 44 is large as compared to the intake tube 12, so that the laundry detergent can quickly pour into a dose cup D. In the embodiment depicted in the figures, the spigot 22 is manually operated. A normally closed valve 104 opens the spigot 22 when one wishes to empty the reservoir 20 into the dose cup D. The spigot 22 is opened when a button 108 is depressed. The button 108 includes a downward extension 110 that contacts a resilient member 112 of the spigot 22 as it rotates about a rounded end 114. When depressed, the extension 110 of the button 108 contacts a rod 116 that is connected to the valve 104 to move the valve out of the outlet 44. The springs forcefully empty the chambers 82 and 84.

The dose cup D will usually be provided as a cap to the detergent bottle. Prior to filling, the dose cup D is held by a cup holder 122 (FIG. 5). The cup holder includes a wall 124 that depends downwardly from an underside of the lower housing portion 28. A U-shaped member 126 extends laterally outward from the wall 124. The U-shaped member is spaced from the underside of the lower housing portion 28 such that a notch 128 is defined between the U-shaped member and the lower housing portion. The notch 128 receives a flange F of the dose cup D holding it in place to receive a charge of detergent.

A plate 130 is disposed over the U-Shaped member 126. Referring to FIG. 2, the plate 130 includes two hollow cylinders 132 that can receive biasing members (not shown) that bias the plate away from the lower housing portion 28 towards the dose cup D. The plate 130 also includes a collar 118 that defines a collar opening 134 that aligns with the outlet 44 of the spigot 22. The collar 118 slopes away from the outlet 44 to inhibit detergent from creeping up the collar opening 134 and forming a puddle on the top of the plate. The collar 118 also includes a rolled end 120 that depends downwardly from the collar 118 around the collar opening 134. The rolled end 120 further inhibits detergent from creeping up the collar opening. The plate 130 can limit the air flow between the ambient environment and the inside volume of the dose cup D to slow any dehydration of residual liquid left in the cup. Also, the plate 130 can apply friction to the rim of the dose cup D for the purpose of retaining the cup in the inserted position in the cup holder 122.

After many laundry cycles the detergent bottle will empty. A shut off mechanism is provided to determine when the liquid level in the bottle is below the entry opening 42 of the inlet tube 12 and to provide a signal to the motor 48 to stop working. One such shut off mechanism comprises circuitry on the printed circuit board 102 acting with a current monitor 136. When the detergent bottle is empty, the pump is acting against a less viscous fluid (air) and draws a current different from normal pumping current. If different current draw persists for a selected interval of pump operation, the motor is shut off and an LED indicator light 138 illuminates.

Figure 9:
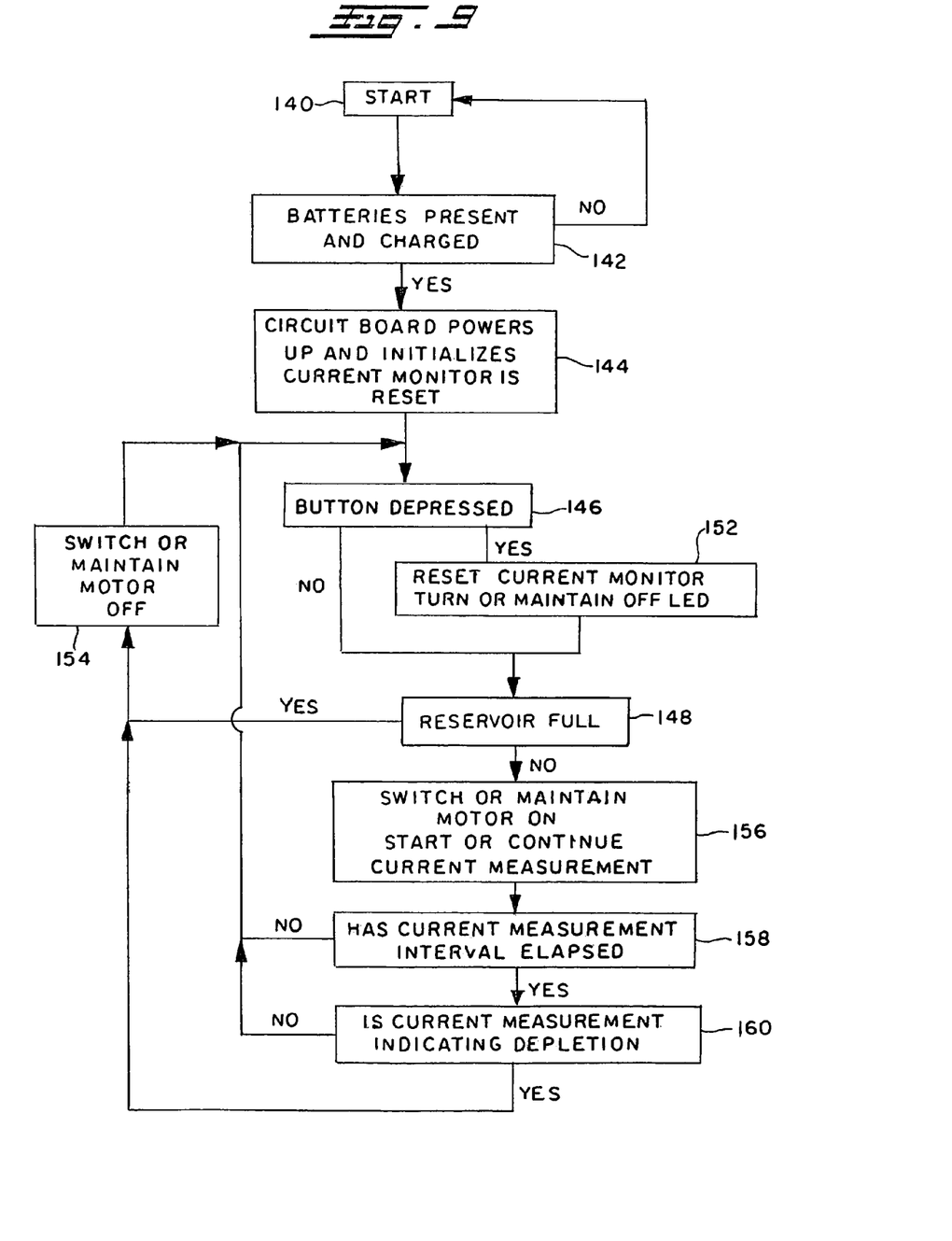
FIG. 9 is a flow diagram of a shut off mechanism of the automatic dispenser of FIG. 1.

Referring to FIG. 9, a flow chart of the operation of the circuitry that controls the shut off mechanism is disclosed. At 140 the control for the shut off mechanism begins. At 142 the shut off mechanism determines whether batteries are present and charged. If charged batteries are present, at 144, the printed circuit board 102 powers up and initializes. If charged batteries are not present, the control continues to query whether batteries are present and charged or, as power is lacking, refrains from taking any further steps. After the printed circuit board powers up and initializes, the current monitor 136 is reset. At 146, the control mechanism determines whether the dispense button 108 has been depressed. If the dispense button 108 has not been depressed, the control mechanism determines whether the reservoir is full at 148. If the dispense button 108 has been depressed, the current monitor 136 is reset and the LED 138 is turned off or maintained off at 152. The control mechanism then determines whether the reservoir 20 is full at 148. If the reservoir 20 is full (switches 98 closed), the motor 48 is switched off at 154 and the control mechanism will then query whether the dispense button 108 has been depressed at 146. If the reservoir is not full, the motor 48 is switched or maintained on and the current monitor 136 measures the motor current at 156. At 158, the control mechanism determines whether the current measurement interval has elapsed. If the current measurement interval has not elapsed, the control mechanism queries whether the dispense button 108 has been depressed at 146. If the current measurement interval has elapsed the control mechanism queries whether the current measurement indicates that the bottle is depleted at 160. If the current measurement indicates that the bottle is not depleted, the control mechanism queries whether the dispense button 108 has been depressed at 146. If the current measurement indicates the bottle is depleted, the control mechanism switches off the motor at 154.

The current monitor 136 measures the difference in motor current between two modes of operation: a pump filled with liquid versus an empty pump. The current monitor circuitry is configured to integrate the motor current value over a few cycles after an intitial measured time interval. The time interval is initiated when the dispense button is depressed and lasts appromixaly three minutes. The purpose of this initial interval is to distinguish initial pump priming, which may require approximately two minutes, from a liquid depletion state. After three minutes the current monitor will then measure maximum motor current over three consecutive armature revolutions, calculate an average value and compare this value to a reference value. If the average value is greater than or equal to the reference value, the motor 48 will be maintained in the ON state and the LED 138 will be maintained in the OFF state. If the average value is less than the reference value, the motor 48 will be deactivated and the LED 138 will be activated to indicate the absence of liquid in the pump chamber. Time intervals and current levels can be altered according to the specific properties of the pump and liquid being pumped. Furthermore, motor current peak values can be scaled in relation to battery voltage, so as not to give a false-empty condition when the battery or power source voltage is low.

The current monitor can also measure the difference in current level between the intake and exhaust strokes, potentially allowing the logic to continue to function even as the voltage level of the battery power supply begins to fall. Various point measurement and averaging schemes may be used for the current measurement. A scheme that averages over three cycles adequately compensates for electric noise to yield a relatively true reading of motor current. A preferred sensing circuit is microprocessor based, allowing one to program different sensing procedures for different pumps and fluids.

Other low-level indication mechanisms may also be provided. One such alternative would be to count motor revolutions after each depress of the dispense button 108. Failure to trigger the reservoir full condition within a preset number of motor revolutions will deactivate the motor and activate the LED. Another alternative includes a liquid level sensor mounted at the bottom of the dip tube. Another alternative includes using a float switch at the liquid surface within the bottle. Yet another alternative includes an optical sensor to look through a transparent tube either upstream or downstream of the pump. A sonic sensor can also be used to measure fluid level in the bottle.

Figure 3:
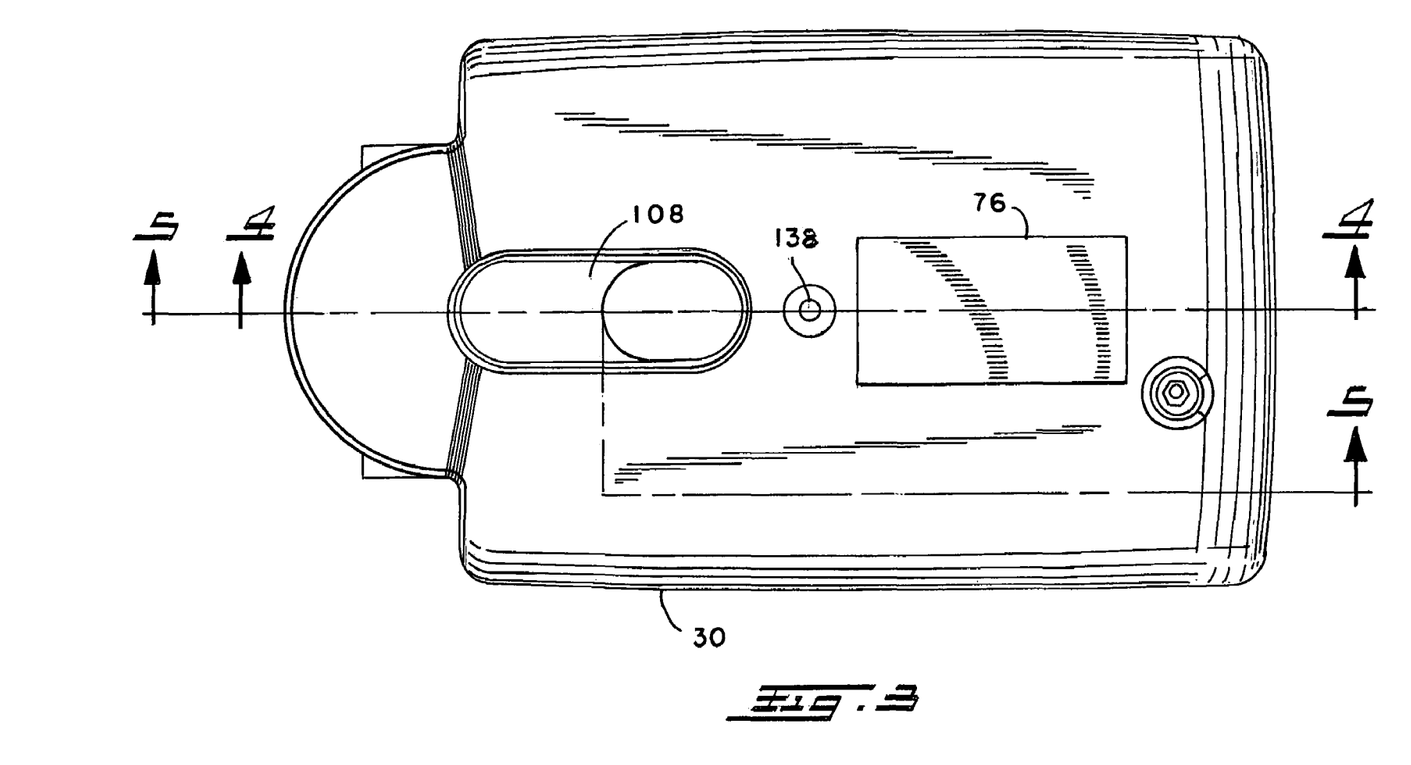
FIG. 3 is plan view of the automatic dispenser of FIG. 1.

Referring back to FIGS. 1–3, the housing 24 encloses the reservoir 20, the pump 14, the motor 48, and all associated components. In the preferred embodiment, the housing 24 has a rounded rectangular shape from a top view. The housing is made from a durable material, one example being plastic. The housing is large enough to hold a reservoir 20 that can hold at least one load's worth of laundry detergent (about 5 to about 7 fluid ounces), a pump and a power source to drive a motor of the pump.

The automatic dispenser also includes the neck 26 that is adapted to mount on the neck of the laundry detergent bottle A. The neck 26 mounts to the lower housing portion 28 so that the housing can mount to the bottle. The neck can be screwed into the opening of the bottle, snap over the opening of the bottle or some other alternative. In the preferred embodiment, the neck 28 is received in the neck opening of the laundry bottle. The neck can include features that allow the neck to adapt and fit over different openings of different bottles. A locking ring 166 can surround the neck 26. The locking ring 166 can secure the neck 26 to the neck of the bottle and allow the neck to adapt to different neck bottle shapes and sizes.

With reference to FIG. 5, the dispenser extends above the bottle a height $H_1$. Height $H_1$, in the preferred embodiment, is equal to or less than the height $H_2$, the height at which the dose cup would extend above the bottle if the dose cup tightly capped the bottle. Height $H_2$, in the embodiment depicted in FIG. 5, is the distance between the flange F and the top of the dose cup D, which is shown upside down. The height of the dispenser 10 is limited to extending only a few inches above the top of the bottle to facilitate placement of the automatic dispenser and the bottle underneath overhead structures, e.g. a cabinet over a shelf of countertop. Such a configuration allows a laundry bottle with a dispenser attached to it to fit into the same height space as the laundry bottle with the cap on it. The width and length of the housing are limited to the confines of the detergent bottle's walls, so that the entire bottle and dispenser can fit into the same space as if the detergent bottle had only a cap as opposed to the dispenser 10 attached to its neck.

Figure 10:
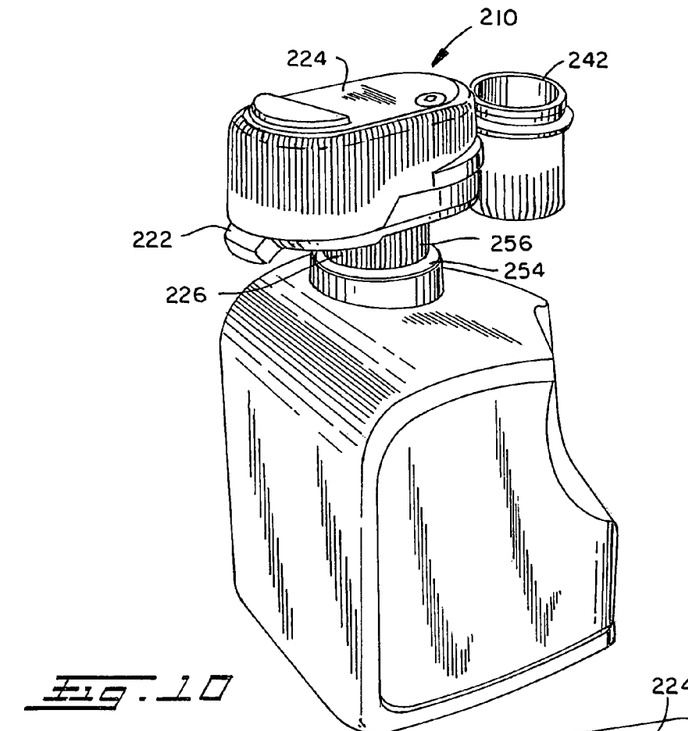
FIG. 10 is a perspective view of an automatic dispenser of an alternative embodiment of the present invention mounted on a retail liquid laundry detergent bottle.

Referring now to FIG. 10, an alternative embodiment for an automatic dispenser 210 for dispensing liquid from a bottle is disclosed. The bottle A is a conventional retail liquid laundry detergent bottle, however the bottle could be any conventional bottle holding a relatively viscous household liquid.

Referring now to FIG. 13, the automatic dispenser 210 includes an intake tube 212, a pump 214, an exhaust tube 218, a reservoir 220, a spigot 222 and electronic controls. The pump, exhaust tube, reservoir, spigot and electronic controls are enclosed in a housing 224 (FIGS. 10–12), and the housing is mounted on the laundry bottle via a neck 226 (FIG. 10) which mounts on the threaded neck of the laundry bottle. In use the dispenser 210 is mounted on a detergent bottle by inserting the intake tube 212 into the bottle A and screwing the dispenser neck 226 onto the threaded neck of the detergent bottle. The intake tube 212 is connected to a pump chamber 216 of the pump 214. The pump chamber communicates with the reservoir 220 through a check valve (not shown) and the exhaust tube 218. The reservoir has a large diameter, gravity fed dispensing spigot 222.

The intake tube 212 provides a passageway for the laundry detergent from the bottle A to the pump chamber 216 of the pump 214. The intake tube 212 depends downwardly from the housing 224 into the bottle A. The intake tube communicates with the pump chamber 216 through a check valve (not shown) allowing fluid to flow into the pump chamber only. In the preferred embodiment, the intake tube has a small diameter when compared to the outlet spigot 222 of the reservoir 220. The intake tube is made from a durable material, one example being plastic. The material for the intake tube should not cause any unwanted reactions with the laundry detergent or any liquid stored in the bottle.

The pump 214 is used to draw the laundry detergent out of the bottle and towards the reservoir 220. The pump 214, which is disposed in the housing 224, includes the pump chamber 216, a piston 228 reciprocating in the pump chamber and the two check valves described above. The pump chamber 216 is disposed in the housing 224 and is in fluid communication with both the intake tube 212 and the exhaust tube 218. The volume of the pump chamber is relatively small as compared to the reservoir 220. The piston 228 disposed in the pump chamber 216 is the work member moving the fluid from the intake tube 212 toward the exhaust tube 218 as it reciprocates.

A motor 230 drives a pivoting arm 232 which in turn rotates along arc B about an axis moving the piston 228 in the pump chamber 216 to draw liquid from the bottle A through the intake tube 212 into the exhaust tube 218 and towards the reservoir 220. The motor in this particular embodiment is a reversible motor operatively connected to a gear reduction transmission to provide the force required to advance a pump piston 228 through its up and down displacement stroke. The size of the motor is relatively small and energy efficient.

The motor is powered by a power source 234, which in the preferred embodiment comprises four AA batteries. The power source could also include rechargeable or replaceable batteries, direct AC voltage, or DC voltage delivered through an AC/DC adapter, among other alternatives.

The cycle of the motor, hence the cycle of the pump, is controlled by certain electronic controls or switches. The stroke of the displacement pump is controlled in this particular embodiment, by controlling the range of motion of a pivoting arm 232 that is connected to the motor. In the embodiment depicted in the schematic view, the motor is controlled by two mechanical limit switches, a start switch 236 and a stop switch 238, and an electric relay 240 configured to create a latching function capable of sustaining the motor in an ON state. Another alternative design includes using two mechanical limit switches and a mechanical latch. In these two alternatives, the limit switches are positioned to trigger at the limits of arc of the pivoting arm. In another and/or alternative design, an electronic circuit in conjunction with one or more position sensors can limit the motion of the pivoting arm. Other systems and mechanisms could be used to control the stroke of the displacement pump, including, but not limited to placing stops in the pump chamber.

Referring back to the path of the laundry detergent from the bottle to the spigot, the exhaust tube 218 connects the pump chamber 216 and the reservoir 220. The exhaust tube can be made of the same material and be of the same design as the intake tube. The exhaust tube, like the intake tube, has a relatively small diameter.

The reservoir 220, which receives the detergent from the exhaust tube 212, is disposed in the housing and holds one load's worth of laundry detergent, typically 5 to 7 fluid ounces. Alternatively, the reservoir could hold more than one load's worth of detergent or multiple reservoirs can be provided. The reservoir can be any shape. Preferably the reservoir has a low spot where the reservoir communicates with the outlet spigot 222.

The detergent is dispensed through spigot 222 which can selectively communicate with the reservoir 220. In the embodiment depicted in the figures, the spigot is manually operated. The spigot is angled to direct flow away from the laundry bottle. The spigot in FIG. 10 is rectangular in shape to allow a dose cup 242 to fit easily underneath the spigot. The spigot can be any other shape. The size of the outlet is large as compared to the intake tube 212, so that the laundry detergent can quickly pour into the dose cup. The outlet is positioned at a low point in the reservoir so that rapid and full draining of the reservoir can take place. A normally closed valve 270 (FIG. 13) opens the spigot 222 when one wishes to empty the reservoir 220 into the dose cup 242 (FIG. 10).

After the reservoir 220 is drained, it must be re-filled. This is accomplished by the action of the pump 214. Likewise, after the reservoir is full, the pump must be turned off. The automatic dispenser includes an internal shut-off mechanism. The internal shut-off mechanism can be any mechanism that will stop the flow of liquid from the bottle to the reservoir. In the preferred embodiment, a float 244 on a lever arm is situated in the reservoir 220. The float shuts off the pump after the reservoir has filled with a load's worth of detergent by opening a reservoir float switch 246. The float switch 246, when opened, interrupts current from the power source 234 to the motor 230. Thus, the pump stops when the reservoir 220 has reached capacity. Other mechanisms could be used as an internal shut-off mechanism. Such mechanisms include, but are not limited to, optical detection using a line of sight across a portion of the reservoir, a timing mechanism to determine the time period a shut-off switch has been opened, a magnet embedded in a float used to activate a reed switch, as well as other mechanisms.

A mechanism to allow the reservoir to fill to some fraction of a full load's worth of detergent may also be provided. This mechanism could shut off the pump after the reservoir has filled to ½ or ⅔ full, or some fraction of the reservoir so that a user who does not want a full load's worth of detergent can still receive the proper amount of detergent dispensed.

After many laundry cycles the detergent bottle A will empty. An automatic shut-off interrupts the pump when the laundry bottle is empty. This automatic shut-off includes a float 248 and a depletion switch 250, which operate to interrupt current to the motor 230 when the bottle A is empty. Other methods of controlling the pump in response to an empty bottle include using the reservoir sensing mechanisms described above to interrogate for a change of level within the reservoir. The absence of a full reservoir for a particular time frame can indicate that the bottle is empty.

Referring back to FIGS. 10–12, the housing 224 encloses the reservoir 220, the pump 214, the motor 230, the pivoting arm 232 and all associated components. In the preferred embodiment, the housing has an elliptical shape from a top view. The housing is made from a durable material, one example being plastic. The housing is large enough to hold a reservoir that can hold at least one load's worth of laundry detergent, a pump and a power source to drive a motor of the pump. The height of the housing is limited to extending only a few inches above the top of the bottle A to facilitate placement of the automatic dispenser and the bottle underneath overhead structures, e.g. a cabinet over a shelf or countertop. Furthermore, the width and depth of the housing are limited to the confines of the detergent bottle's walls.

The automatic dispenser also includes a neck 226 that is adapted to mount on the neck of the laundry detergent bottle A. The neck is mounted to an underside of the housing 224 so that the housing can mount to the bottle. The neck can be screwed into the opening of the bottle, snap over the opening of the bottle or some other alternative. The neck can include features that allow the neck to adapt and fit over different openings of different bottles. In the preferred embodiment, the neck includes an apron 254 that surrounds a central cylinder. The apron 254 can be used to engage bottle necks with exterior threads. The apron can also limit spills from the bottle, in the event the bottle is tipped over. The neck of the preferred embodiment also includes a gripping arrangement 256, which in this instance includes ribs that are parallel with the central axis of the neck. The ribs allow the user to more easily grip the neck when mounting the automatic dispenser on the bottle.

Figures 11, 12:
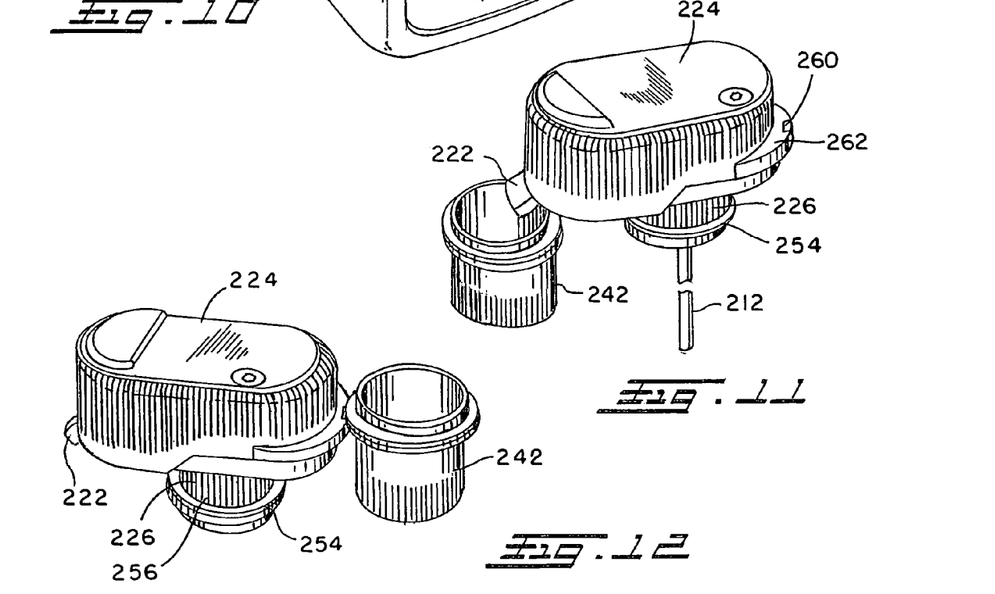
FIG. 11 is a perspective view of the automatic dispenser of FIG. 10 removed from the retail liquid laundry detergent bottle with a dose cup positioned underneath a spigot.
FIG. 12 is a perspective view of the automatic dispenser of FIG. 10 removed from the retail liquid laundry detergent bottle with the dose cup mounted on the housing in a storage position.

The dose cup 242 provided with the automatic dispenser has a conventional cylindrical shape. The dose cup holds at least one load's worth of laundry detergent. As seen in FIG. 12, the dose cup is mounted to the housing 224 when not in use. The dose cup also includes a ridge that can fit into a notch 260 (FIG. 11) formed in a ledge 262 (FIG. 11) of the housing. The ridge and notch hold the cup in place when not in use.

Laundry detergent is a viscous fluid; therefore, pumping it will either require a great amount of energy or a long time. By providing a separate reservoir, as opposed to pumping detergent straight from the bottle to the dose cup, an energy efficient slow replenishment cycle can be used to refill the reservoir. The pump can operate at a slower and more efficient rate than if the pump had to pump directly from the bottle into a dose cup. The refill process can take minutes without causing inconveniences since the reservoir can refill while the washing machine is working through its cycle. If the washing cycle of the washing machine is sped up or slowed down, the rate at which the reservoir is refilled can be changed accordingly.

Dispensing is accomplished quickly as pumping is not involved. Dispensing by gravity from a reservoir allows for small and energy efficient components to refill the reservoir. Even though refilling the reservoir may take minutes, dispensing detergent from the reservoir can occur in seconds because of the large diameter gravity fed reservoir outlet.

Additional benefits of the invention include that the overall size of the housing can be minimized because of the small pumping apparatus needed. Also, energy drain from the batteries is minimized because the speed at which the reservoir is re-filled is not critical.

Accordingly, an automatic dispenser that fulfills all of the above-mentioned objectives has been provided. The invention has been described with reference to the preferred embodiment. Obviously, modifications and alterations will occur to others upon reading and understanding the preceding detailed description. One such example is that the pump described above is a positive displacement pump, similar to those employed in soap dispensers. In addition to the pump described, the pump can be any conventional pump that is small enough to fit into the compact housing, including, but not limited to, a rotary pump, a screw-type pump, a diaphragm pump or a peristaltic pump. It is intended that the invention described be construed to include all reasonable modifications and alterations that come within the scope of the appended claims.

What is claimed:

1. An automatic dispenser for dispensing liquid stored in a container, the dispenser comprising:
   a housing;
   a reservoir disposed in said housing;
   a pump having a pump chamber, said pump for drawing liquid from an associated container;
   an intake tube in fluid communication with the pump chamber, said intake tube adapted to be disposed in the associated container;
   an exhaust tube in fluid communication with the pump chamber and said reservoir;
   a spigot for selectively discharging liquid from said reservoir; and
   wherein the dispenser has a height such that when the dispenser is mounted on the associated container the dispenser extends above the associated container about equal to or less than the height that a standard cap for the associated container would extend above the container.

2. The automatic dispenser of claim 1, wherein said housing has a width that is less than or equal to the width of a conventional laundry detergent bottle.

3. The automatic dispenser of claim 2, wherein said housing has a length that is less than or equal to the length of a conventional laundry detergent bottle.

4. The automatic dispenser of claim 1, wherein said reservoir is dimensioned to hold about one laundry load's worth of liquid.

5. The automatic dispenser of claim 1, wherein said reservoir includes a chamber dimensioned to hold about one-half of one load's worth of laundry detergent.

6. The automatic dispenser of claim 1, wherein said reservoir is dimensioned to hold about 5 fluid ounces to about 7 fluid ounces of liquid.

7. The automatic dispenser of claim 1, wherein said reservoir is under pressure.

8. The automatic dispenser of claim 7, further comprising a piston disposed in said reservoir.

9. The automatic dispenser of claim 8, further comprising a spring biasing said piston.

10. The automatic dispenser of claim 9, further comprising a switch disposed in said reservoir.

11. The automatic dispenser of claim 10, wherein said switch is activated by said piston and communicates with said motor.

12. The automatic dispenser of claim 1, wherein said reservoir is adapted to empty under gravity flow.

13. The automatic dispenser of claim 1, wherein said reservoir includes at least two chambers.

14. The automatic dispenser of claim 1, wherein said pump is adapted to pump liquid from the associated bottle to said reservoir such that it takes several minutes to fill said reservoir.

15. The automatic dispenser of claim 1, wherein said pump is adapted to pump liquid from the associated bottle to said reservoir at a pumping rate and the reservoir is adapted to dispense liquid from the reservoir at a dispensing rate, wherein the pumping rate is less than the dispensing rate.

16. The automatic dispenser of claim 15, wherein the pumping rate is such that said reservoir fills with liquid in less than the time of a laundry cycle of a conventional washing machine.

17. The automatic dispenser of claim 1, further comprising an internal shut-off mechanism to stop the flow of liquid between the pump chamber and said reservoir.

18. The automatic dispenser of claim 17, further comprising a motor operatively connected to said pump.

19. The automatic dispenser of claim 18, wherein said internal shut-off includes a motor current monitor.

20. The automatic dispenser of claim 19, wherein the current monitor measures a difference in current drawn by said motor between when said pump is filled with liquid and when said pump has no liquid.

21. The automatic dispenser of claim 19, wherein the current monitor measures current drawn by said motor over a plurality of consecutive armature revolutions.

22. The automatic dispenser of claim 1, further comprising means for determining whether the associated container contains liquid.

23. The automatic dispenser of claim 1, further comprising a motor operatively connected to said pump.

24. The automatic dispenser of claim 23, wherein said motor engages said pump through a speed reducing transmission.

25. The automatic dispenser of claim 24, wherein the transmission is adapted to translate rotational movement of said motor to reciprocal movement.

26. The automatic dispenser of claim 1, wherein the diameter of said intake tube is less than the diameter of the spigot.

27. The automatic dispenser of claim 1, further comprising a cup holder mounted to said housing, said cup holder adapted to receive a cap from the associated container.

28. The automatic dispenser of claim 1, further comprising a check valve disposed in said intake tube proximal an end of said tube opposite the pump chamber.

29. The automatic dispenser of claim 1, further comprising a neck attached to said housing and adapted to mount to the associated container.

30. The automatic dispenser of claim 29, wherein said neck is adapted to fit over different sized openings of associated containers.

31. The automatic dispenser of claim 29, further comprising a lock ring at least substantially surrounding said neck.

32. The automatic dispenser of claim 1, further comprising an indicator for indicating when the associated bottle is depleted of liquid.

33. The automatic dispenser of claim 32, wherein said indicator comprises an LED.

34. An automatic dispenser for dispensing liquid stored in a container, the dispenser comprising:
 a housing;
 a reservoir disposed in said housing;
 a pump in communication with said reservoir, wherein said pump is adapted to pump liquid from the associated container at a pumping rate;
 a motor for driving said pump;
 an intake tube in fluid communication with said reservoir and adapted to be disposed in an associated container; and
 a spigot in communication with said reservoir for selectively dispensing liquid from said reservoir, said spigot is adapted to selectively dispense liquid from said reservoir at a dispensing rate, wherein the dispensing rate is greater than the pumping rate.

35. The dispenser of claim 34, wherein said reservoir is dimensioned to store at least one laundry load's worth of liquid detergent.

36. An automatic dispenser for dispensing liquid stored in a container, the dispenser comprising:
 a housing;
 a reservoir disposed in said housing;
 a pump in communication with said reservoir;
 an intake tube in fluid communication with said reservoir and adapted to be disposed in an associated container;
 a spigot in communication with said reservoir for selectively dispensing liquid from said reservoir; and
 a cup holder associated with said housing, said cup holder configured to receive a cap from the associated container.

37. The automatic dispenser of claim 36 wherein the cup holder includes a member defining a notch between said housing and the member, the notch being adapted to receive a flange of the cap from the associated container.

38. The automatic dispenser of claim 36, further comprising a plate for at least partially covering the cap from the associated container.

39. The automatic dispenser of claim 38, wherein the plate is spring loaded.

40. The automatic dispenser of claim 38, wherein the plate includes an opening aligned with said spigot.

41. The automatic dispenser of claim 40, wherein the plate includes a collar surrounding the opening in the plate.

42. The automatic dispenser of claim 41, wherein the collar slopes away from the spigot.

43. The automatic dispenser of claim 41, wherein the collar includes a rolled end depending downwardly from around the opening.

* * * * *